(12) United States Patent
Inoue

(10) Patent No.: US 10,097,507 B2
(45) Date of Patent: Oct. 9, 2018

(54) INFORMATION PROCESSING APPARATUS INCLUDING A DHCP SERVER FUNCTION, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Go Inoue, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 15/236,693

(22) Filed: Aug. 15, 2016

(65) Prior Publication Data

US 2017/0054795 A1     Feb. 23, 2017

(30) Foreign Application Priority Data

Aug. 21, 2015    (JP) .................. 2015-163748

(51) Int. Cl.
| | |
|---|---|
| *H04L 29/12* | (2006.01) |
| *H04W 48/02* | (2009.01) |
| *H04W 76/02* | (2009.01) |
| *H04W 74/08* | (2009.01) |
| *H04W 8/26* | (2009.01) |
| *H04W 76/14* | (2018.01) |
| *H04W 76/11* | (2018.01) |

(Continued)

(52) U.S. Cl.
CPC ...... *H04L 61/2015* (2013.01); *H04L 61/2038* (2013.01); *H04L 61/2046* (2013.01); *H04W 8/26* (2013.01); *H04W 48/02* (2013.01); *H04W 74/0833* (2013.01); *H04W 76/021* (2013.01); *H04W 76/023* (2013.01); *H04W 76/11* (2018.02); *H04W 76/14* (2018.02); *H04W 80/04* (2013.01); *H04W 84/18* (2013.01)

(58) Field of Classification Search
CPC ............ H04L 61/2015; H04L 61/2038; H04L 61/2046; H04W 8/26; H04W 76/021; H04W 76/023; H04W 74/0833; H04W 80/04; H04W 84/18; H04W 48/00–48/20
See application file for complete search history.

(56) References Cited

U.S. PATENT DOCUMENTS 8,976,391 B2     3/2015   Nanaumi

FOREIGN PATENT DOCUMENTS

| JP | 2003101551 A | 4/2003 |
|---|---|---|
| JP | 2013205982 A | 10/2013 |

*Primary Examiner* — Joshua Kading
(74) *Attorney, Agent, or Firm* — Rossi, Kimms & McDowell LLP

(57) ABSTRACT

An information processing apparatus which can reduce the trouble of operation since a user does not have to irregularly operate a reconnection operation.
A printing device 100 as the information processing apparatus includes a DHCP server function and distributes different IP addresses to external devices respectively. If a number of external devices connected to the printing device 100 in the IP layer level has reached a first connection number, when an IP address distribution request is sent from a first external device after a connection to the first external device in the wireless link layer level is established, an IP address is not controlled to be distributed to the first external device. If not, the IP address is controlled to be distributed to the first external device so that the connection to the first external device in the IP layer level becomes available.

18 Claims, 7 Drawing Sheets

(51) Int. Cl.
*H04W 84/18* (2009.01)
*H04W 80/04* (2009.01)

INFORMATION PROCESSING APPARATUS INCLUDING A DHCP SERVER FUNCTION, CONTROL METHOD FOR INFORMATION PROCESSING APPARATUS, AND STORAGE MEDIUM

BACKGROUND OF THE INVENTION

Field of the Invention

The present invention relates to an information processing apparatus, a control method for the information processing apparatus, and a storage medium, especially relates to an information processing apparatus that performs wireless communication directly with a mobile terminal, a control method for the information processing apparatus, and a storage medium.

Description of the Related Art

Regarding information processing apparatuses such as a multifunctional machine, a printer, and the like, more of them have provided with a wireless LAN function. Those information processing apparatuses receive print data from an external device such as a personal computer or a mobile terminal via an access point and execute a printing process based on the received print data.

Further, some of those information processing apparatuses perform wireless communication directly with the external device without the access point. For example, Japanese Laid-Open Patent Application (Kokai) No. 2013-205982 discloses an information processing apparatus that performs wireless communication directly with a mobile terminal using Wi-Fi Direct.

In this manner, when wireless communication is directly performed, it is common to restrict the number of connectable terminals. This is because, when connections are unlimitedly allowed, a problem such as an insufficient memory or reduced performance of the information processing apparatus may occur. In order to prevent an occurrence of such a problem, it is known that by defining a maximum connection device number of external devices as a predetermined value, and some information processing apparatuses control not to connect with external devices more than the maximum connection device number (for example, see Laid-Open Patent Application (Kokai) No. 2003-101551).

When an information processing apparatus performs Wi-Fi Direct communication with a mobile terminal, conventionally, the connection is established in a sequence illustrated in FIG. 7.

Firstly, a user performs a wireless connection preparation operation to manually input an SSID and a KEY with a mobile terminal 710 and execute a handover operation with an NFC touch (step S701). With such an operation, the mobile terminal 710 establishes a connection in a wireless link layer level by sending a connection request to an information processing apparatus 700 (steps S702 and S703). Next, by sending an Internet Protocol (IP) address request to the information processing apparatus 700, the mobile terminal 710 establishes a connection in an IP layer level so that a printing process becomes available when an IP address is distributed from the information processing apparatus 700 (steps S704 and S705).

However, there is a case that the number of the external devices connected to the information processing apparatus 700 has reached the maximum connection device number. In such a case, when a connection request is received from the mobile terminal 710 in step S702, the information processing apparatus 700 transmits, to the mobile terminal 710, a connection result indicating that the connection in the wireless link layer level is refused in response to the connection request (step S703).

When the mobile terminal 710 retries the connection to the information processing apparatus 700 after the connection result is transmitted, user's trouble becomes complicated since the wireless connection preparation operation such as the manual input or handover operation in step S701 has to be started over.

Further, since the user does not know when a spot of the maximum connection number of the information processing apparatus 700 opens up (whether it becomes in a vacant spot available condition), the user has to irregularly retry the wireless connection preparation operation of step S701. Further, there has been a problem that, as a result of the retry of the wireless connection preparation operation, when the information processing apparatus 700 is not yet in a vacant spot available condition, user's operation becomes wasted.

SUMMARY OF THE INVENTION

The present invention provides an information processing apparatus that includes a Dynamic Host Configuration Protocol (DHCP) server function, a control method for the information processing apparatus, and a storage medium, which can reduce the trouble of operation since a user does not have to irregularly operate a reconnection operation.

To achieve the above object, according to a first aspect of the present invention, an information processing apparatus that includes a DHCP server function having a wireless link layer and an IP layer, the information processing apparatus comprising a distribution unit configured to distribute different IP addresses to a plurality of external devices respectively, a determining unit configured to determine whether or not a number of at least one external device connected in the IP layer level has reached a first connection number that represents a number of external devices connectable in the IP layer level, when an IP address distribution request is sent from a first external device after a connection to the first external device in the wireless link layer level is established, and a control unit configured to control the distribution unit not to distribute an IP address to the first external device when it is determined by the determining unit that the first connection number has been reached, and control the distribution unit to distribute the IP address to the first external device so that the connection to the first external device in the IP layer level becomes available when it is determined that the first connection number has not been reached.

To achieve the above object, according to a second aspect of the present invention, an information processing apparatus that includes a DHCP server function having a wireless link layer and an IP layer, the information processing apparatus comprising a distribution unit configured to distribute different IP addresses to a plurality of external devices respectively, a determining unit configured to determine whether or not a number of at least one external device connected in the IP layer level has reached a first connection number that represents a number of external devices connectable in the IP layer level, after a connection to a first external device in the wireless link layer level is established, and a control unit configured to stop operation of the distribution unit when it is determined by the determining unit that the first connection number has been reached, and controls the distribution unit to distribute an IP address to the first external device so that a connection to the first external device in the IP layer level becomes available when it is determined that the first connection number has not been reached and when an IP address distribution request is sent from the first external device.

According to the present invention, a trouble of operation can be reduced since a user does not have to irregularly perform a reconnection operation.

Further features of the present invention will become apparent from the following description of exemplary embodiments (with reference to the attached drawings).

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

Firstly, a network structure according to the present embodiment will be explained.

Figure 1:
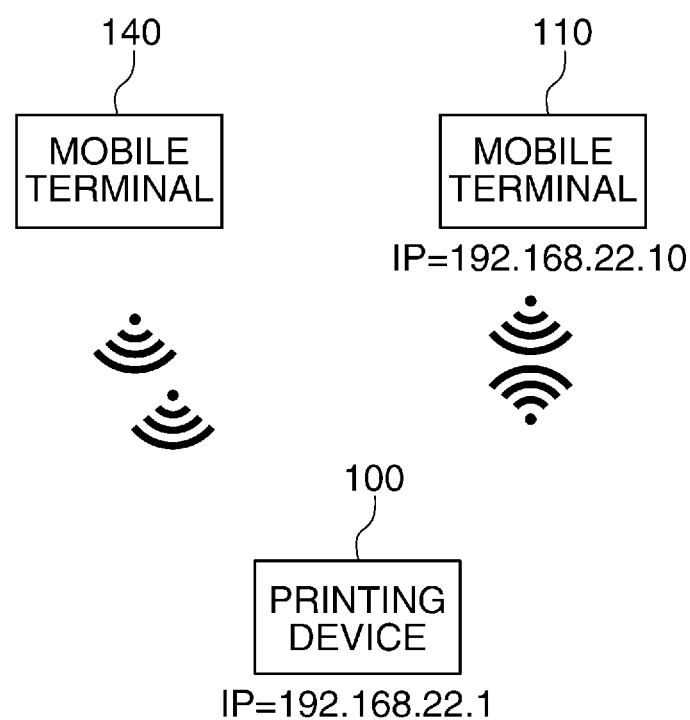
FIG. 1 is a diagram illustrating a configuration of a network including a printing device as an information processing apparatus according to a first embodiment of the present invention.

FIG. 1 is a diagram illustrating a configuration of a network including a printing device as an information processing apparatus according to the first embodiment of the present invention.

In FIG. 1, a printing device 100 is a multifunctional machine, which performs a Wi-Fi Direct communication with a mobile terminal 110 and another mobile terminal 140 serving as external devices. The printing device 100 functions as a server of the Wi-Fi Direct communication and works to receive a connection request and distribute an IP address with a DHCP server function. The mobile terminal 110 and the another mobile terminal 140 serve as clients of Wi-Fi Direct communication and work to transmit a connection request and operate after setting an IP address distributed as a DHCP client to the own devices.

Here, in the present embodiment, the printing device 100, which is a multifunctional machine, is exemplified as the information processing apparatus; however, it is not limited to this example and, as long as it is an information processing apparatus that distributes, as a DHCP server, an IP address to a DHCP client, a printer without a scanning function or a facsimile machine may be used, for example.

Further, in the present embodiment, the mobile terminal 110 and another mobile terminal 140 are exemplified as an external terminal, it is not limited to this example and, as long as it is a device that can perform wireless communication with the printing device 100 as a DHCP client, a personal computer may be used for example.

Next, a configuration of the printing device 100 will be explained.

Figure 2:
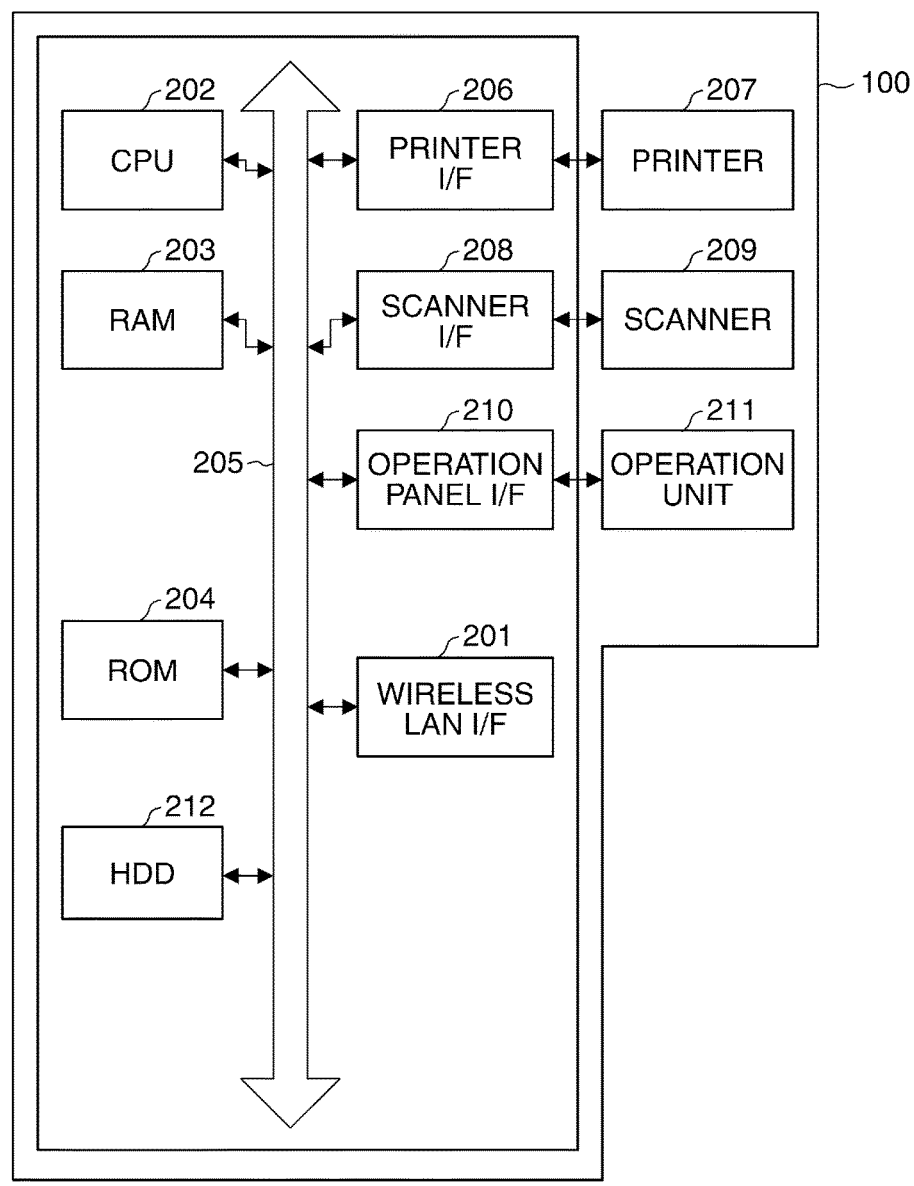
FIG. 2 is a hardware configuration diagram of the printing device of FIG. 1.

FIG. 2 is a hardware configuration diagram of the printing device 100 of FIG. 1.

In FIG. 2, a CPU 202 reads a control program stored in a ROM 204 and executes various processes to control operation of the printing device 100 such as a DHCP server function. The ROM 204 stores the control program. A RAM 203 is used as a main memory of the CPU 202 and as a temporary storage region of a work area or the like. An HDD 212 stores various data such as print data, a scanned image, and the like.

Here, in a case of the printing device 100, it is assumed that the single CPU 202 executes each process in the later described flowchart; however, the process may be executed in other manners. For example, a plurality of CPUs may work together to execute each of the processes described in the later described flowchart.

A printer 207 executes a printing process to print on a sheet based on print data received from the mobile terminal 110 or the another mobile terminal 140 or a scanned image generated by a scanner 209. The scanner 209 reads an original document and generates a scanned image (read image data). The scanned image generated by the scanner 209 is printed by the printer 207 or stored in the HDD 212. Here, in the present embodiment, the printing process is described as a data process of the data received from the mobile terminal 110; however, the data process of the present invention is not limited to this example and, for example, it may be a process to fax the data received from the mobile terminal 110 to an external facsimile machine via an unillustrated facsimile transmission and reception unit.

An operation unit 211 includes a liquid crystal display unit having a touch panel function or a keyboard and displays later described various screens. A user inputs an instruction or information to the printing device 100 with the operation unit 211.

A wireless LAN I/F 201 executes wireless communication with an external device such as the mobile terminal 110 or the another mobile terminal 140 using Wi-Fi Direct.

Next, a process executed in the printing device 100 when the number of external devices connected to the printing device 100 in an IP layer level reaches a maximum DHCP connection number (first connection number) will be explained.

Figure 3:
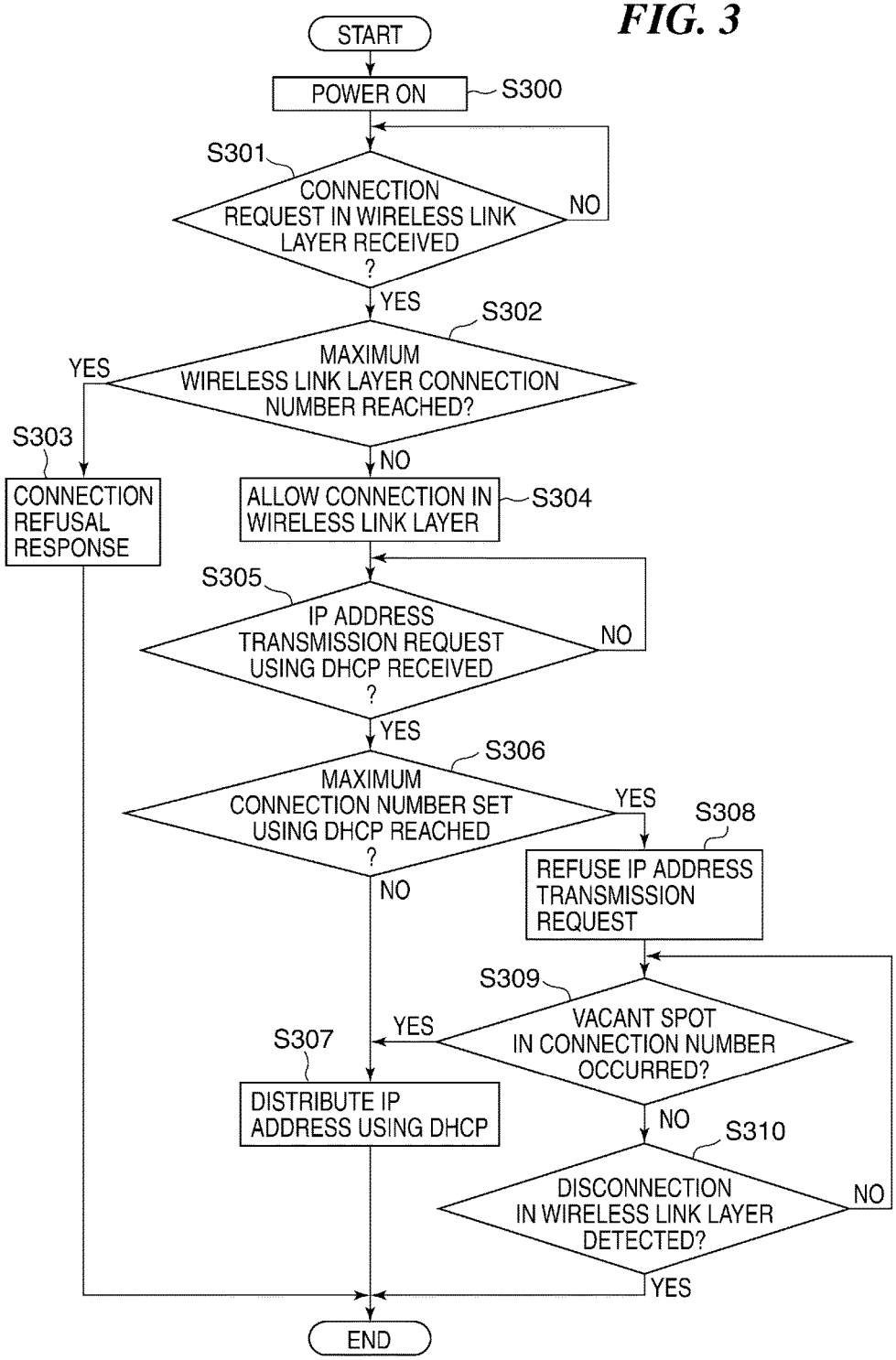
FIG. 3 is a flowchart illustrating a procedure of a process in a case that the number of external devices connected to the printing device in an IP layer level has reached a maximum DHCP connection number, according to the first embodiment of the present invention.

FIG. 3 is a flowchart illustrating a procedure of a process in a case that the number of external devices connected to the printing device 100 in an IP layer level has reached a maximum DHCP connection number, according to the first embodiment of the present invention.

Each step illustrated in the flowchart of FIG. 3 is processed by the CPU 202 executing a control program stored in the memory such as the ROM 204 by developing the program to the RAM 203.

After the power of the printing device 100 is turned on (step S300), when the CPU 202 determines that a connection request using Wi-Fi Direct (i.e. in a wireless link layer level) is received from the mobile terminal 110 (YES, in step S301), the process proceeds to step S302. This connection request is performed by the user inputting an SSID or the like in the side of the mobile terminal 110.

In step S302, the CPU 202 determines whether the number of external devices connected to the printing device 100 in the wireless link layer level reaches the maximum wireless link layer level connection number (the number of external devices connectable in the wireless link layer level, which is a second connection number). Here, in the present embodiment, the maximum wireless link layer level connection number cannot be changed since a wireless chip or a firmware in the printing device 100 defines a fixed value.

When it is determined that the maximum connection number in the wireless link layer level has been reached (YES in step S302), the CPU 202 transmits a response of connection refusal to the mobile terminal 110 (step S303) and ends the process. In this case, the mobile terminal 110 displays on its user interface an error notification such as "The connection to the printing device cannot be established." or the like, and the input of SSID or the like performed by the user in the mobile terminal 110 to request a Wi-Fi Direct connection is reset. Thus, after notifying this error, to send a Wi-Fi Direct connection request again from the mobile terminal 110, the user needs to re-enter the SSID or the like. Here, in step S303, the mobile terminal 110 promptly displays the error notification upon receiving the connection refusal response; however, the Wi-Fi Direct connection request may be retried a certain number of times without displaying the error notification. In this case, the user does not have to re-enter the SSID or the like in the mobile terminal 110 side during the retry; however, if no vacant spot is available in the wireless link layer level during the certain number of retries, the error notification is displayed after the retry has timed out.

On the other hand, when it is determined that the maximum wireless link layer level connection number has not been reached (NO in step S302), the CPU 202 transmits a connection permit response to the mobile terminal 110 and establishes the connection in the wireless link layer (step S304). After establishing the connection in the wireless link layer, since the mobile terminal 110 requests distribution of an IP address to the printing device 100 via DHCP, the CPU 202 determines in step S305 whether the IP address distribution request is received. When the CPU 202 determines that the IP address distribution request is received (YES in step S305), the process proceeds to step S306.

In step S306, the CPU 202 determines whether the maximum DHCP connection number (the number of external devices connectable to the printing device 100 in the IP layer level, which is a first connection number) has been reached.

Figure 4:
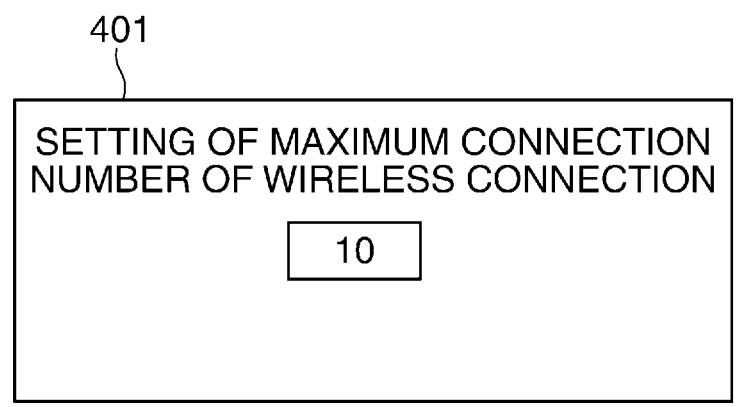
FIG. 4 is a diagram illustrating a setting screen for setting the maximum DHCP connection number according to the first embodiment of the present invention.

Here, the maximum DHCP connection number is set with a numerical value input by an operation, on a setting screen (input unit) 401 of FIG. 4, of a user as a system administrator who administrates the network of FIG. 1.

Here, when the numerical value input on the setting screen 401 by the system administrator is a value that is larger than the maximum wireless link layer connection number, the CPU 202 displays, on a liquid crystal display unit of the operation unit 211, an error notification to prompt him to make the numerical value on the setting screen 401 to be equal to or less than the maximum wireless link layer level connection number. Here, the determining of whether or not the numerical value on the setting screen 401 is larger than the maximum wireless link layer connection number is performed as follows in detail. Firstly, when the system administrator inputs an arbitrary numerical value on the setting screen 401, the CPU 202 makes an inquiry about performance information to a driver of the wireless chip (not illustrated) in the printing device 100. With this inquiry, the CPU 202 acquires a value of the maximum connection number in the wireless link layer and performs the determining by comparing the acquired value and the numerical value on the setting screen 401.

With the above described structure, the maximum DHCP connection number is certainly set to a value which is equal to or less than the maximum wireless link layer connection number, the maximum number of connected external devices is managed as an IP layer level maximum connection number that can be changed on the setting screen 401 by the system administrator, not as an unchangeable maximum wireless link layer level connection number that is a fixed value. Accordingly, the usability for the system administrator who administrates the network of FIG. 1 can be improved.

More specifically, this administration is performed by setting the maximum connection number in the wireless link layer level as a fixed value so that it will not be "Yes" in step S302 in a common network use and practically restricting the number of external devices to which the printing device 100 can be connected based on the above-described maximum DHCP connection number set by the user.

Referring back to FIG. 3, when it is determined that the maximum DHCP connection number has not been reached (NO in step S306), the CPU 202 distributes an IP address to the mobile terminal 110 with a DHCP server function and ends the process after making a condition that the connection to the mobile terminal 110 in the IP layer level is available (step S307).

On the other hand, when it is determined that the maximum DHCP connection number has been reached (YES in step S306), the CPU 202 controls the DHCP server function to refuse the IP address distribution request (step S308). In this case, the mobile terminal 110 promptly displays, on the user interface, an error notification such as "The connection to the printing device cannot be established."

Here, the mobile terminal 110 may have a structure to retry the IP address distribution request a certain number of times to try a reconnection. However, even during the retry, after requesting the IP address distribution and when the user instructs printing on the user interface of the mobile terminal 110, an error notification such as "Printing is not available." is promptly displayed. Thus, differently from the case of the connection refusal in step S303, the user does not have to feel stress due to a delay of the error notification display. Further, after displaying this error notification, since the connection in the wireless link layer is maintained, even when the user makes a decision to request the IP address distribution to the printing device 100 from the mobile terminal 110 again after a while, the trouble of the operation can be reduced since there is no need to re-enter the SSID or the like required to request the Wi-Fi Direct connection, differently from the case of the connection refusal in step S303.

Here, according to the present embodiment, in step S308, the CPU 202 refuses the IP address distribution request; however, the DHCP server function may be controlled so as to ignore the IP address distribution request and make no response. This control is performed by a method that DHCP server function is active but the DHCP server function is made not to make any response to the IP address distribution request or the like, when it is determined that the maximum connection number has been reached in step S306.

In this manner, when the DHCP server function is controlled to ignore the IP address distribution request and make no response, the mobile terminal 110 retries the IP address distribution request a certain number of times to try a reconnection.

However, during the retry, when the user instructs printing with the mobile terminal 110 after requesting the IP address distribution, an error notification such as "Printing is not available." is promptly displayed on the user interface. Thus, differently from the case of the connection refusal in step S303, the user does not have to feel stress caused by that the error notification display is delayed until the retry has timed out. Further, after displaying this error notification, since the connection in the wireless link layer is maintained, even when the user makes a decision to request an IP address distribution to the printing device 100 from the mobile terminal 110 again after a while, the trouble of the operation can be reduced since there is no need to re-enter the SSID or the like required to request the Wi-Fi Direct connection, differently from the case of the connection refusal in step S303.

After the process in step S308, when Wi-Fi Direct communication with the another mobile terminal 140 ends and it is determined that there is a vacant spot of connection device numbers (YES in step S309), the CPU 202 distributes an IP address to the mobile terminal 110 using the DHCP server function and ends the process after making the condition that a connection in the IP layer is available (step S307).

On the other hand, there is a case that the wireless connection is terminated in the mobile terminal 110 before a vacant spot of the connection device numbers becomes available (NO in step S309). For example, it is a case that the retry of the IP address distribution request by the mobile terminal 110 has timed out or a case that the user expressly cancels the IP address distribution request in the mobile terminal 110 based on the error notification such as "Printing is not available." or the like. In such cases, the CPU 202 detects the disconnection of the wireless link layer (step S310) and ends the process.

According to the present embodiment, in a case that an IP address distribution request from the mobile terminal 110 is received, the IP address distribution to the mobile terminal 110 is refused if the maximum DHCP connection number has been reached, and the IP address is distributed to the mobile terminal 110 if the maximum DHCP connection number has not been reached. Accordingly, an occurrence of a problem of an insufficient memory or reduced performance of the printing device 100 due to connection with many external devices using the IP addresses can be prevented and trouble of the operation can be reduced since the user does not need to irregularly execute the reconnection operation. Further, stress of the user caused by a delay of an error notification can be reduced.

Figure 5:
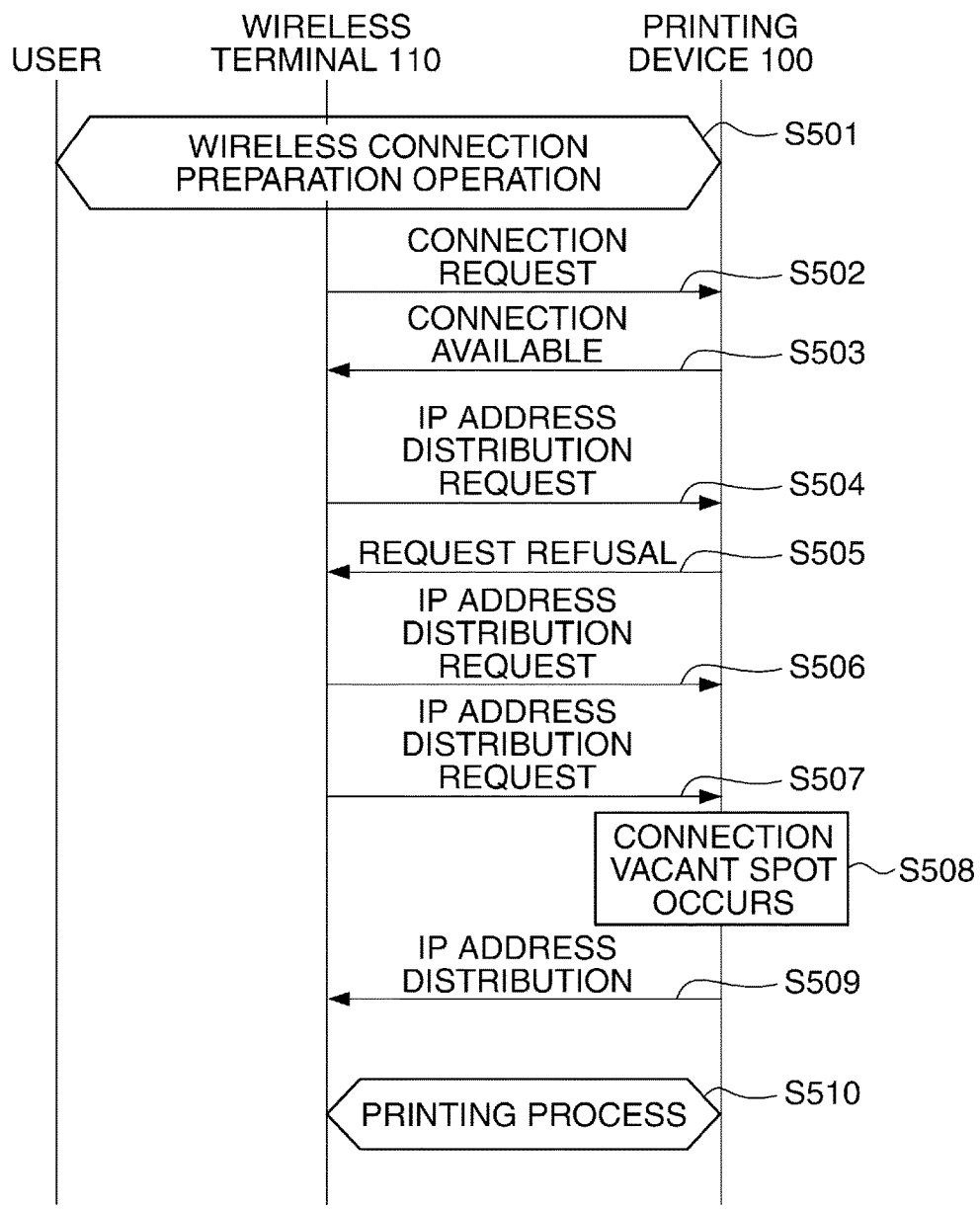
FIG. 5 is a sequence diagram in a case that the printing device according to the first embodiment of the present invention distributes an IP address to a mobile terminal.

FIG. 5 is a sequence diagram in a case that the printing device 100 according to the first embodiment of the present invention distributes an IP address to the mobile terminal 110.

Firstly, when the user performs a wireless connection preparation operation with the mobile terminal 110 (step S501), the mobile terminal 110 sends a connection request to the printing device 100 (step S502). When the printing device 100 replies that the connection is available in response to this request (step S503), a connection between the printing device 100 and the mobile terminal 110 in the wireless link layer is completed.

After that, in step S504, the mobile terminal 110 transmits an IP address distribution request using DHCP to the printing device 100. However, in the embodiment illustrated in FIG. 5, at the timing of this IP address distribution request, the number of external devices connected to the printing device 100 has already reached the maximum DHCP connection number. The CPU 202 thus refuses this IP address distribution request and does not distribute an IP address (step S505). In and after step S506, the mobile terminal 110 periodically retransmits the IP address distribution request to the printing device 100. During the periodical retransmission of the IP address distribution request, when a vacant spot occurs in the Wi-Fi Direct communication connection executed by the printing device 100 (step S508), the CPU 202 distributes an IP address to the mobile terminal 110 with the DHCP server function (step S509).

After that, when the mobile terminal 110 establishes a connection to the printing device 100 in the IP layer level using the IP address distributed in step S509 and then a printing process request is transmitted from the mobile terminal 110 to the printing device 100, the printing device 100 executes a printing process according to the printing process request (step S510).

As described above, according to the present embodiment, the CPU 202 of the printing device 100 firstly establishes a connection to the mobile terminal 110 in the wireless link layer. Next, when an IP address distribution request is transmitted from the mobile terminal 110, the CPU 202 determines whether to distribute an IP address to the mobile terminal 110 with the DHCP server function according to whether or not the number of external devices connected to the printing device 100 has reached the maximum DHCP connection number. Accordingly, even when the IP address distribution request is retransmitted, since the user of the mobile terminal 110 needs to perform the wireless connection preparation operation only once, the load of the operation can be reduced. In other words, after the connection between the mobile terminal 110 and the printing device 100 in the wireless link layer level is completed, since the user may simply wait until the connection between the mobile terminal 110 and the printing device 100 in the IP layer level is automatically established, the usability can be improved.

Second Embodiment

In the above described first embodiment, when the maximum DHCP connection number has been reached in the printing device 100 at the timing of the IP address distribution request transmitted from the mobile terminal 110, the CPU 202 controls the DHCP server function to refuse or ignore the IP address distribution request. On the contrary, in the second embodiment, when the maximum DHCP connection number has been reached in the printing device 100 at the timing when the connection to the mobile terminal 110 in the wireless link layer is established, the CPU 202 stops the DHCP server function. Accordingly, as a result, the CPU 202 controls the DHCP server function not to respond anything to the IP address distribution request transmitted from the mobile terminal 110 afterward.

Thus, the hardware configuration of the printing device as an information processing apparatus according to the second embodiment is basically same as that of the printing device 100. Similarly, the hardware configurations of a mobile terminal and another mobile terminal as external devices that perform Wi-Fi Direct communication with the printing device are respectively and basically same as those of the mobile terminal 110 and another mobile terminal 140. Thus, the same references are applied to the same configurations of the printing device, mobile terminal, and another mobile terminal which have the same structures of the printing device 100, the mobile terminal 110, and the another mobile terminal 140, and redundant explanation will be omitted.

Figure 6:
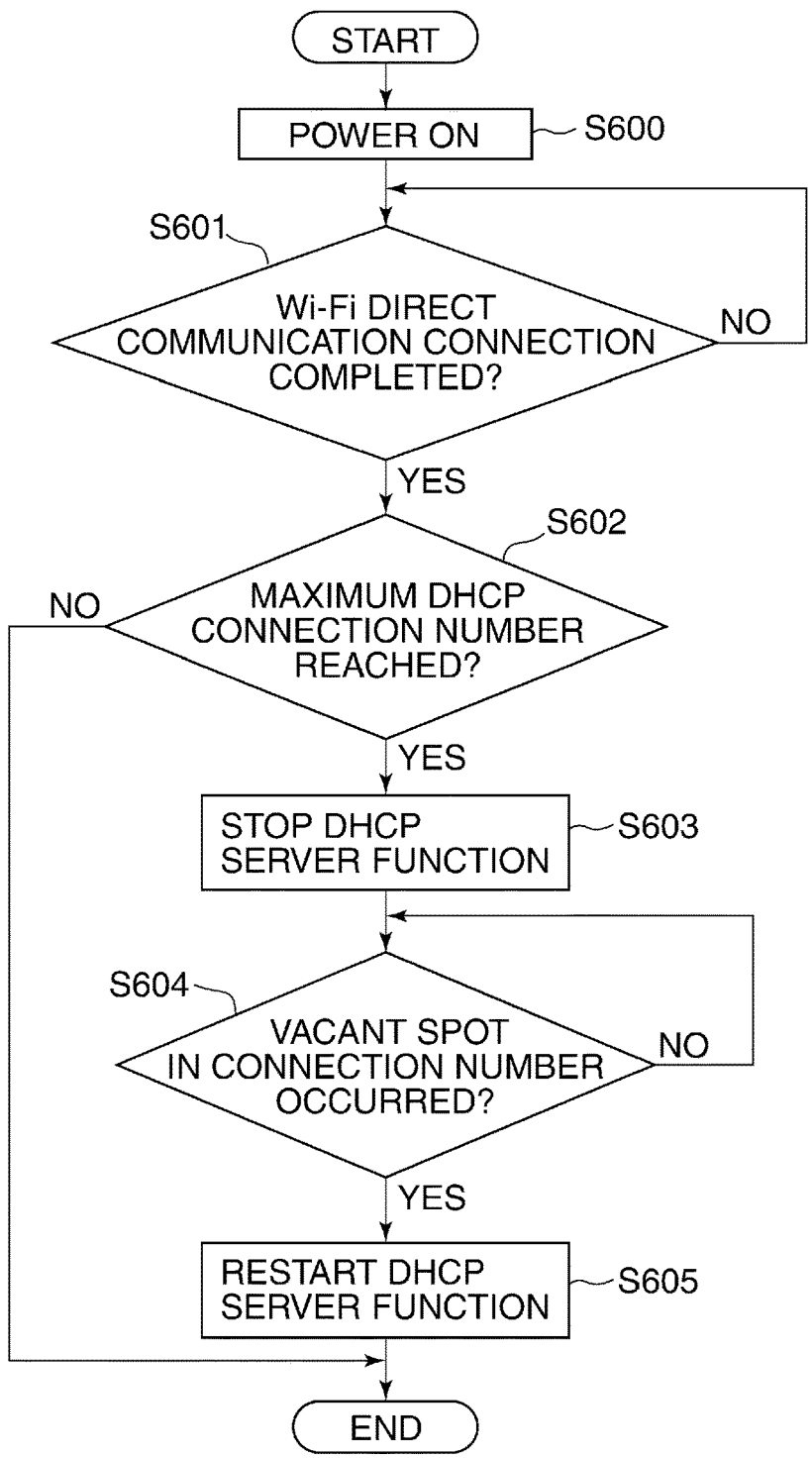
FIG. 6 is a flowchart illustrating a procedure of a process in a case that the number of external devices connected to the printing device in an IP layer level has reached the maximum DHCP connection number, according to a second embodiment of the present invention.
Figure 7:
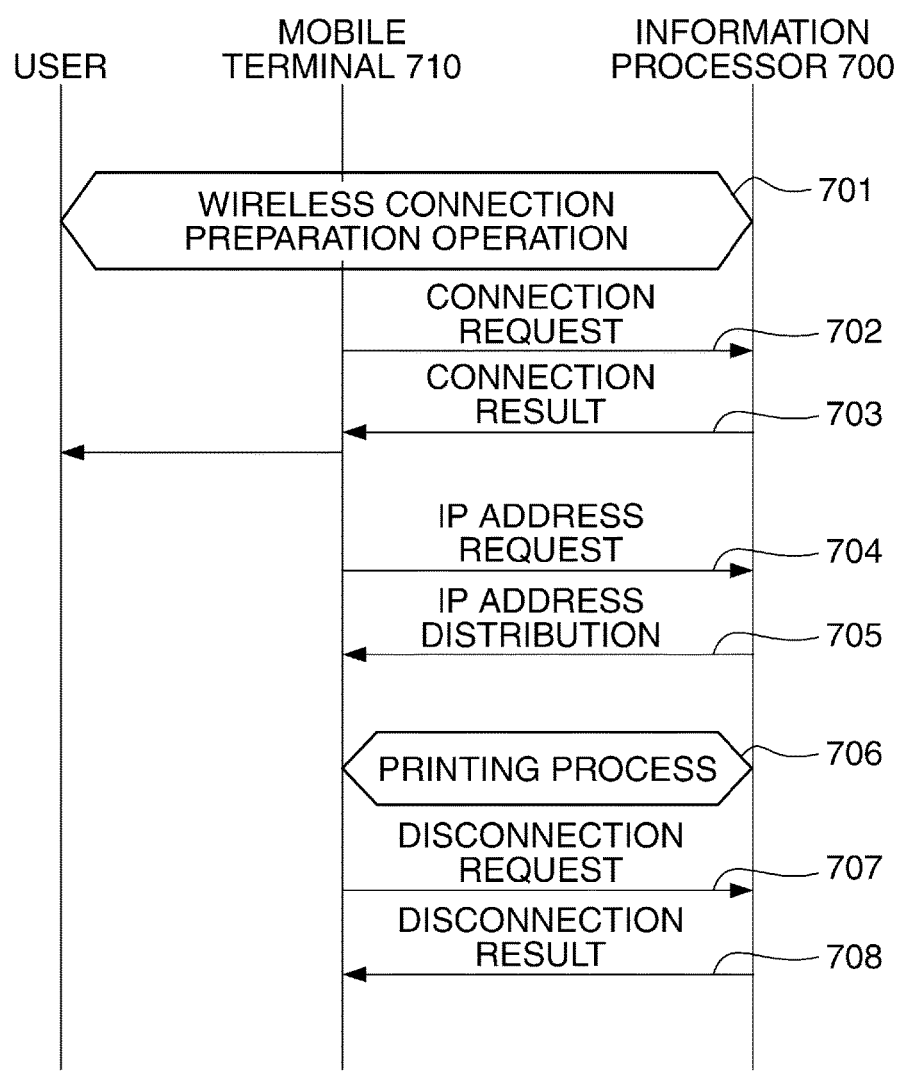
FIG. 7 is a diagram illustrating a connection sequence of a conventional technique.

FIG. 6 is a flowchart illustrating a procedure of a process in a case that the number of external devices connected to the printing device 100 in the IP layer level has reached the maximum DHCP connection number, according to the second embodiment of the present invention.

Similarly to FIG. 3, respective steps illustrated in the flowchart of FIG. 6 are also performed by the CPU 202 executing a control program stored in the memory such as the ROM 204 by developing the program to the RAM 203.

After the power of the printing device 100 is turned on (step S600), the CPU 202 determines in step S601 whether the connection to the mobile terminal 110 using Wi-Fi Direct communication has been completed (whether the connection in the wireless link layer has been established). When it is determined that the connection has been completed (YES in step S601), the process proceeds to step S602 and the CPU 202 determines whether or not the maximum DHCP connection number has been reached in the printing device 100. When it is determined that the maximum DHCP connection number has been reached (YES in step S602), the process proceeds to step S603 and the CPU 202 stops the DHCP server function. Accordingly, during the suspension period of the DHCP server function, even when an IP address distribution request from the mobile terminal 110 using DHCP is transmitted to the printing device 100, no response to this IP address distribution request is sent. In other words, as a result, the CPU 202 can control the DHCP server function not to send any response to the IP address distribution request transmitted from the mobile terminal 110 after the process in step S603, and can manage the connection device number of external devices connected to the printing device 100 to be equal or less than the maximum DHCP connection number.

Next, the CPU 202 continues to monitor the connected device number until a vacant spot occurs in the Wi-Fi Direct communication connection performed in the printing device 100 and, when it is determined that a vacant spot occurs in the Wi-Fi Direct communication connection (YES in step S604), the CPU 202 restarts the DHCP server function (step S605). In this manner, the CPU 202 stops the DHCP server function when the maximum DHCP connection number has been reached in the printing device 100 and restarts the DHCP server function when a vacant spot occurs in the Wi-Fi Direct communication connection so that the maximum DHCP connection number can be properly controlled.

As explained above, according to the present embodiment, the CPU 202 of the printing device 100 establishes a connection to the mobile terminal 110 in the wireless link layer. Next, depending on whether or not the previously set maximum DHCP connection number has been reached, it is chosen to stop or restart the DHCP server function. Accordingly, since the user of the mobile terminal 110 does not have to perform the wireless connection preparation operation more than once, the load of operation can be reduced. Further, after the connection between the mobile terminal 110 and the printing device 100 in the wireless link layer level is completed, the user may simply wait until the connection between the mobile terminal 110 and the printing device 100 in the IP layer level is automatically established, and the usability can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163748, filed Aug. 21, 2015, which is hereby incorporated by reference herein in its entirety.

What is claimed is:

1. An information processing apparatus that is configured to connect to at least one of a plurality of external devices in a wireless link layer level and in an Internet Protocol (IP) layer level and that includes a Dynamic Host Configuration Protocol (DHCP) server function configured to distribute different IP addresses to the plurality of external devices respectively, the information processing apparatus comprising:

one or more processors configured to cause the information processing apparatus to:

determine whether or not a number of at least one external device connected to the information processing apparatus in the IP layer level has reached a first connection number that represents a number of external devices connectable in the IP layer level, when an IP address distribution request is received from a first external device after a connection to the first external device is established in the wireless link layer level; and not distribute an IP address to the first external device when it is determined that the first connection number has been reached, and distribute the IP address to the first external device so that a connection to the first external device in the IP layer level becomes available when it is determined that the first connection number has not been reached.

2. The information processing apparatus according to claim 1, wherein the one or more processors are configured to refuse the IP address distribution request when it is determined that the first connection number has been reached.

3. The information processing apparatus according to claim 1, wherein the one or more processors are configured to ignore the IP address distribution request when it is determined that the first connection number has been reached.

4. The information processing apparatus according to claim 1, wherein, after it is determined that the first connection number has been reached and when a connection to a second external device in the IP layer level using another distributed IP address ends, the one or more processors are configured to distribute an IP address to the first external device.

5. The information processing apparatus according to claim 1, wherein the one or more processors are configured to set the first connection number based on a user's operation.

6. The information processing apparatus according to claim 5, wherein the one or more processors are configured to perform an error notification when the set first connection number is greater than a second connection number that represents a number of external devices connectable in the wireless link layer level.

7. The information processing apparatus according to claim 1, wherein the one or more processors are configured to cause the information processing apparatus to:
determine whether or not a number of at least one external device connected to the information processing apparatus in the wireless link layer level has reached a second connection number that represents a number of external devices connectable in the wireless link layer level, when a connection request in the wireless link layer level is received from the first external device, and
not connect the first external device to the information processing apparatus in the wireless link layer level when it is determined that the second connection number has been reached.

8. The information processing apparatus according to claim 7, wherein the one or more processors are configured to cause the information processing apparatus to:
transmit a response of connection refusal to the first external apparatus when it is determined that the second connection number has been reached.

9. An information processing apparatus that is configured to connect to at least one of a plurality of external devices in a wireless link layer level and in an Internet Protocol (IP) layer level and that includes a Dynamic Host Configuration Protocol (DHCP) server function configured to distribute different IP addresses to the plurality of external devices respectively, the information processing apparatus comprising:
one or more processors configured to cause the information processing apparatus to:
determine whether or not a number of at least one external device connected to the information processing apparatus in the IP layer level has reached a first connection number that represents a number of external devices connectable in the IP layer level, after a connection to a first external device is established in the wireless link layer level; and
stop operation of the DHCP server function when it is determined that the first connection number has been reached, and distribute an IP address to the first external device so that a connection to the first external device in the IP layer level becomes available when it is determined that the first connection number has not been reached and an IP address distribution request is received from the first external device.

10. The information processing apparatus according to claim 9, wherein, after stopping the operation of the DHCP server function and when a connection to a second external device in the IP layer level using another distributed IP address ends, the one or more processors are configured to restart operation of the DHCP server function.

11. The information processing apparatus according to claim 9, wherein the one or more processors are configured to set the first connection number based on a user's operation.

12. The information processing apparatus according to claim 11, wherein the one or more processors are configured to perform an error notification when the set first connection number is larger than a second connection number that represents a number of external devices connectable in the wireless link layer level.

13. The information processing apparatus according to claim 1, wherein the information processing apparatus is a printing device.

14. The information processing apparatus according to claim 9, wherein the information processing apparatus is a printing device.

15. A control method for an information processing apparatus that is configured to connect to at least one of a plurality of external devices in a wireless link layer level and in an Internet Protocol (IP) layer level and that includes a Dynamic Host Configuration Protocol (DHCP) server function configured to distribute different IP addresses to the plurality of external devices respectively, the method comprising:
determining whether or not a number of at least one external device connected to the information processing apparatus in the IP layer level has reached a first connection number that represents a number of external devices connectable in the IP layer level, when an IP address distribution request is received from a first external device after a connection to the first external device is established in the wireless link layer level; and
not distributing an IP address to the first external device when it is determined that the first connection number has been reached, and distributing the IP address to the first external device so that a connection to the first external device in the IP layer level becomes available when it is determined that the first connection number has not been reached.

16. A control method for an information processing apparatus that is configured to connect to at least one of a plurality of external devices in a wireless link layer level and in an Internet Protocol (IP) layer level and that includes a Dynamic Host Configuration Protocol (DHCP) server function configured to distribute different IP addresses to the plurality of external devices respectively, the method comprising:
determining whether or not a number of at least one external device connected to the information processing apparatus in the IP layer level has reached a first connection number that represents a number of external devices connectable in the IP layer level, after a connection to a first external device is established in the wireless link layer level; and stopping operation of the DHCP server function when it is determined that the first connection number has been reached, and distributing an IP address to the first external device so that the connection to the first external device in the IP layer level becomes available when it is determined that the first connection number has not been reached and an IP address distribution request is received from the first external device.

17. A non-transitory computer-readable storage medium having stored therein a program for causing a computer to implement a control method for an information processing apparatus that is configured to connect to at least one of a plurality of external devices in a wireless link layer level and in an Internet Protocol (IP) layer level and that includes a Dynamic Host Configuration Protocol (DHCP) server function configured to distribute different IP addresses to the plurality of external devices respectively, the method comprising:

determining whether or not a number of at least one external device connected to the information processing apparatus in the IP layer level has reached a first connection number that represents a number of external devices connectable in the IP layer level, when an IP address distribution request is received from a first external device after a connection to the first external device is established in the wireless link layer level; and not distributing an IP address to the first external device when it is determined that the first connection number has been reached, and distributing the IP address to the first external device so that a connection to the first external device in the IP layer level becomes available when it is determined the first connection number has not been reached.

18. A non-transitory computer-readable storage medium having stored therein a program for causing a computer to implement a control method for an information processing apparatus that is configured to connect to at least one of a plurality of external devices in a wireless link layer level and in an Internet Protocol (IP) layer level and that includes a Dynamic Host Configuration Protocol (DHCP) server function configured to distribute different IP addresses to the plurality of external devices respectively, the method comprising:

determining whether or not a number of at least one external device connected to the information processing apparatus in the IP layer level has reached a first connection number that represents a number of external devices connectable in the IP layer level after a connection to a first external device is established in the wireless link layer level; and stopping operation of the DHCP server function when it is determined that the first connection number has been reached, and distributing an IP address to the first external device so that a connection to the first external device in the IP layer level becomes available when it is determined that the first connection number has not been reached and an IP address distribution request is received from the first external device.

* * * * *